Patented Sept. 29, 1925.

1,555,639

UNITED STATES PATENT OFFICE.

DAVID T. DAY, OF WASHINGTON, DISTRICT OF COLUMBIA; ELIZABETH E. DAY EXECUTRIX OF SAID DAVID T. DAY, DECEASED.

FILTERING MATERIAL AND PROCESS OF PREPARING THE SAME.

No Drawing. Application filed November 12, 1924. Serial No. 749,569.

*To all whom it may concern:*

Be it known that I, DAVID T. DAY, a citizen of the United States, residing at Washington, District of Columbia, have invented certain new and useful Improvements in Filtering Materials and Processes of Preparing the Same, of which the following is a specification.

This invention relates to the production of a remarkably efficient filtering compound from shale particularly spent shale, which is commonly treated as waste.

Oil-bearing shale such as that found in certain parts of California usually contains silica and after the oil has been distilled off and the residual carbon burnt out, it is found to be very finely porous. This porous silicious spent shale has been used for the refining and filtering of oils. It has been found, however, that the adsorbing powers may be considerably increased by treating the shale so as to line the pores with a substance which probably closely resembles silica gel.

The material to be treated may be any earthy material containing silica, preferably of a diatomaceous nature.

In conducting the process, spent shale, for example, in lump form or any other form, is dumped into a suitable container with caustic soda, preferably in the form of a strong solution. The mixture is allowed to stand for about six hours in the cold, or it may be heated to about 212° F. for about one minute. A weak solution of caustic soda may be used, in which case the heating may be carried on for a longer time.

The caustic soda solution enters into the minute pores of the silicious shale above described, and forms water glass therein.

The caustic soda solution is withdrawn and the porous material is then treated with sulphuric acid, preferably strong. This sets free silicic acid in the fine pores of the spent shale. The sodium sulphate formed, is washed out with water and the shale is steamed until there is no more reaction for sulphuric acid in the filtrate. The washed material is then heated to a low red heat until it is dry.

Each fine pore in the spent shale by this treatment is lined with a coating of a gel like character, which is still finer and still more porous. In other words, there is obtained by this method a sponge of spent shale, the pores of which are lined with a substance having better adsorbing qualities than the spent shale itself. The cost of manufacturing it is small compared with the cost of "silica gel" as it is ordinarily made, and it will be recognized that the material used would otherwise be a valueless waste product.

It is understood that caustic potash or any other alkali which is capable of reacting with silica to form soluble silicates may be used in place of caustic soda and any acid such as hydrochloric acid or mixture of acids may be used in place of sulphuric acid.

The process outlined above provides for an improved filtering material consisting of shale particularly porous burnt shale having distributed throughout its mass, a silicious adsorbing material prepared from the shale itself.

I claim:—

1. The process of preparing a filtering compound from a porous spent shale of a silicious nature, heating the shale with a strong caustic soda solution whereby the caustic soda enters the pores of the shale and forms sodium silicate with the silica in the pores; adding sulphuric acid to set free silicic acid in the pores, washing the shale with water until free from sodium sulphate, and heating the washed shale to a low red heat until dry.

2. The process of preparing a filtering compound, comprising heating porous spent shale of a silicious nature in a solution of caustic soda, adding sulphuric acid to set free silicic acid in the pores of the shale, and washing the shale with water until free from sodium sulphate.

3. The process of increasing the porosity of a porous filtering compound, characterized by the presence of silica within the pores, consisting in heating the compound with a strong caustic soda solution, adding sulphuric acid, prior to any washing, to set free silicic acid in the pores of the compound, thereupon washing it with water until free from sodium sulphate, and heating it until dry.

4. The process of preparing a filtering compound from spent shale of a silicious nature, which process consists in heating the shale with an alkali, adding an acid to set free silicic acid, washing the mixture with water until free from the salts resulting from the addition of the acid to the alkali, and heating to a low red heat until dry.

5. A process of preparing a filtering compound, comprising adding an alkali solution to a porous filtering material, characterized by the presence of silica within the pores, whereby the alkali forms a soluble silicate with the silica in the pores, adding an acid, prior to any washing, to set free silicic acid in the pores, separating the liquid matter from the solid matter, thereupon washing the said solid with water and heating the washed solid until dry.

6. A filtering material consisting of lumps of porous burnt shale characterized by the presence of a silicious adsorbing material within the pores.

7. A filtering material consisting of lumps of porous spent shale, the pores being lined with a silicious adsorbing material.

8. A filtering material consisting of a mass of burnt shale having particles of silicious adsorbing material distributed throughout the mass.

9. A filtering material consisting of shale having particles of silicious adsorbing material distributed throughout the same.

In testimony whereof I affix my signature.

DAVID T. DAY.